United States Patent Office 3,657,420
Patented Apr. 18, 1972

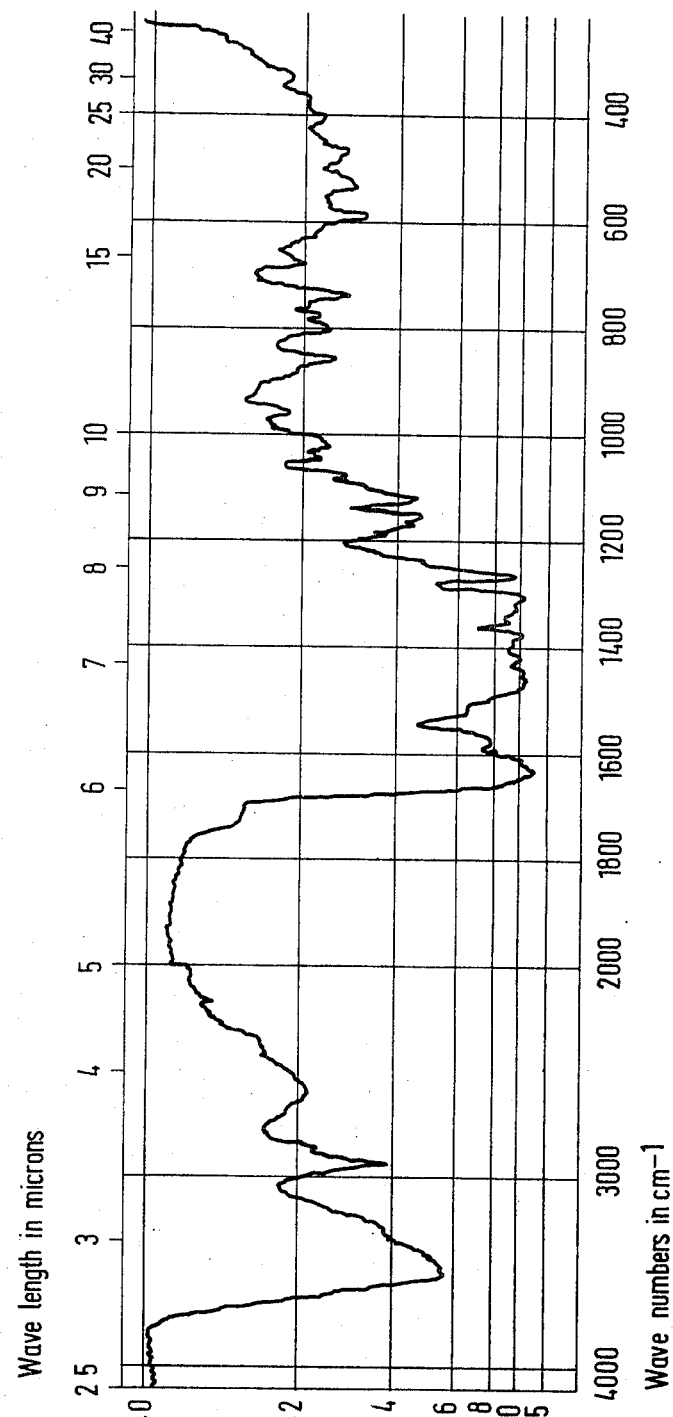

3,657,420
ANTIBIOTIC PREPARED BY CULTIVATION OF STREPTOMYCES ROSEOPULLATUS AND DESIGNATED 17967 RP
Denise Mancy, Charenton, Val-de-Marne, and Leon Ninet and Jean Preud'homme, Paris, France, assignors to Rhone-Poulenc S.A., Paris, France
Filed May 12, 1969, Ser. No. 823,557
Claims priority, application France, May 13, 1968, 151,589
Int. Cl. A61k 21/00
U.S. Cl. 424—121
10 Claims

ABSTRACT OF THE DISCLOSURE

The antibiotic designated 17,967 R.P. is prepared by aerobically cultivating Streptomyces roseopullatus DS 20,073 (NRRL 3430), which is a new species of Streptomyces, using an aqueous nutrient medium containing assimilable sources of carbon, nitrogen and inorganic substances. The antibiotic has an antimitotic activity in addition to antibacterial properties.

---

Figure 1:
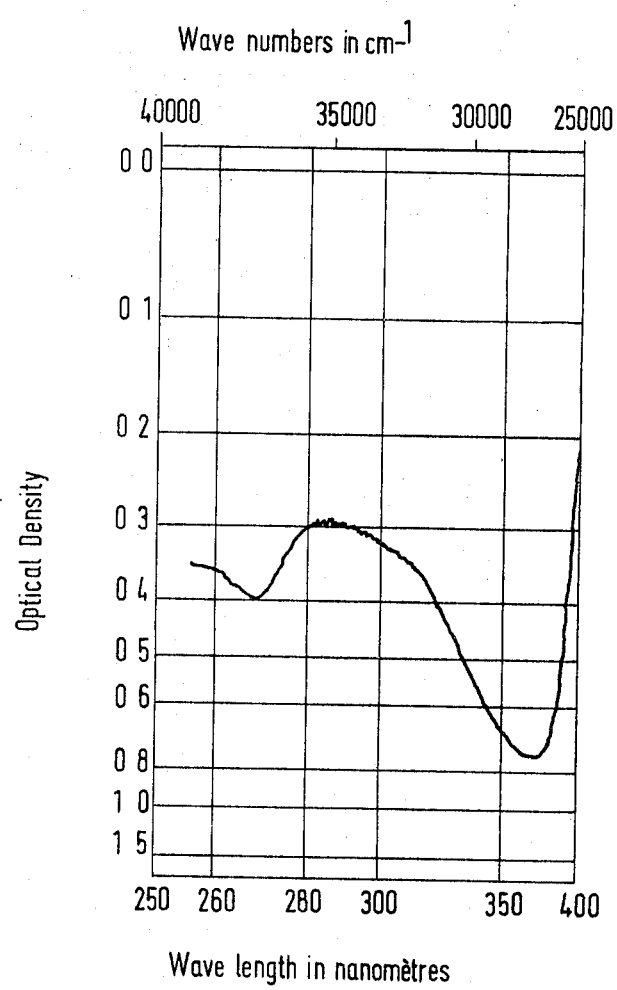

This invention relates to a new antibiotic, hereinafter designated by the number 17,967 R.P., to a process for its preparation and pharmaceutical compositions containing it.

This new antibiotic is of very particular interest not only because of its antibacterial activity, which is exerted against bacteria belonging to various categories, but also because of its very pronounced antimitotic activity which it exerts on certain malignant tumours. These properties are all the more interesting because 17,967 R.P. retains a very strong activity against microorganisms (and particularly strains of staphylococci) which have been rendered resistant to certain anticancer antibiotics such as chromomycin, rufocromomycin and daunorubicin.

17,967 R.P. is produced by culture in artificial culture media of a microorganism, identified more completely hereinafter, belonging to the genus Streptomyces and designated by the name Streptomyces roseopullatus, DS 20,073 (NRRL 3430). A specimen of this strain has been deposited with the United States Department of Agriculture, Northern Regional Research Laboratory, at Peoria, Ill., United States of America, and has been given the number NRRL 3430; a sample of the microorganism can be obtained from the aforementioned Research Laboratory.

Antibiotic 17,967 R.P. is soluble in dimethylformamide, relatively soluble in pyridine, very slightly soluble in acetone, methanol and water, and insoluble in diethyl ether, cyclohexane and hexane. It contains carbon, hydrogen, oxygen and nitrogen, and has the following elementary composition: C=61.5%, H=5.25%, O=20.0%, N=12.5%.

It is characterised by the physical properties given below:

Appearance: yellow microcrystalline powder.
Melting point: 290–300° C. (decomposition.)
Ultra-violet spectrum: (determined with a solution of 10.5 mg./l. in dimethylformamide)

an absorption maximum at 268 nm. ($E_{1cm}^{1\%}=377$)

an absorption minimum at 285 nm. ($E_{1cm}^{1\%}=281$)

an absorption maximum at 368 nm. ($E_{1cm}^{1\%}=707$)

nm. being the abbreviation for nanometres.

This spectrum is shown in FIG. 1 of the accompanying drawings in which the abscissae give the wavelengths expressed in nanometres (lower scale) and the wavenumbers in cm.$^{-1}$ (upper scale), and the ordinate gives the optical densities.

Visible spectrum: (determined with a solution of 10.5 mg./l. in dimethylformamide).—The visible spectrum does not show any characteristic absorption.

Infra-red spectrum: (determined with tablets of a mixture with KBr).—This spectrum is shown in FIG. 2 in which the abscissae give the wavelengths expressed in microns (upper scale) and the wavenumbers in cm.$^{-1}$ (lower scale), and the ordinates give the optical densities.

The principal infra-red absorption bands of 17,967 R.P. expressed in wave numbers in cm.$^{-1}$ are given in Table I which follows:

TABLE I

| | | | | | |
|---|---|---|---|---|---|
| 3460 s. | 1655 sh. | 1390 m. | 1175 sh. | 1000 w. | 660 sh. |
| 3350 sh. | 1630 vs. | 1375 s. | 1170 m. | 980 vw. | 625 sh. |
| 3230 sh. | 1610 sh. | 1350 s. | 1150 s. | 955 m. | 585 m. |
| 2930 s. | 1600 sh. | 1325 m. | 1125 sh. | 910 sh. | 530 m. |
| 2850 m. | 1575 s. | 1315 w. | 1115 s. | 880 sh. | 480 sh. |
| 2690 sh. | 1515 s. | 1305 vs. | 1100 sh. | 855 m. | 465 m. |
| 2590 s. | 1490 sh. | 1280 sh. | 1075 m. | 805 m. | 430 sh. |
| 2350 sh. | 1475 sh. | 1265 vs. | 1045 m. | 775 w. | 400 m. |
| 2160 vw. | 1455 vs. | 1240 m. | 1035 sh. | 760 w. | 365 w. |
| 1720 sh. | 1440 m. | 1220 sh. | 1020 m. | 735 m. | 325 m. |
| | 1420 s. | 1185 m. | 1010 w. | 675 m. | | vs.=very strong, s.=strong, m.=medium, w.=weak, vw.=very weak and sh.=shoulder

Optical rotation: 17,967 R.P. is optically active. In a dimethylformamide solution its optical rotation is $[\alpha]_D^{20}=+103°\pm2°$ (c.=0.5).

Thin layer chromatography: 17,967 R.P. may be identified by thin layer chromatography according to Stahl. The chromatographic support is Merck silica gel (F 254, ready to use, or H buffered to pH 8 by a M/3 phosphate buffer) in the form of 0.25 mm. thick plates. Development is carried out in an upward direction. The chromatogram is examined in Wood's light, in daylight or by bioautography on a nutrient agar plate inoculated with Bacillus subtilis. Table II below gives the Rf values of 17,967 R.P. as a function of the solvent and of the support.

TABLE II

| Support | Solvent | Rf |
|---|---|---|
| F 254 | Chloroform-methanolacetone 78–20–2 (v./v.) | 0.6 |
| F 254 | Chloroform-methanol 87–13 (v./v.) | 0.4 |
| H buffered to pH 8 | Acetone-dioxan 50–50 (v./v.) | 0.6 |

These chromatograms suggest that 17,967 R.P. consists of a single substance.

17,967 R.P. has an antibiotic activity to quite a significant extent against bacteria belonging to very diverse categories. It does not show any appreciable crossed resistance in respect of its antibacterial strength with chromomycin, rufocromomycin or daunorubicin, and only shows a slight and insignificant crossed resistance with actinomycin.

Table III below gives its bacteriostatic activity towards a certain number of microorganisms; for each microorganism the minimum concentrations of antibiotic which under specified conditions, inhibits all visible development of the microorganism in an appropriate nutrient broth, was determined, following one of the dilution methods usualy employed for this purpose. The minimum bacteriostatic concentrations determined in this way are expressed in micrograms of 17,967 R.P. per cc. of test medium.

TABLE III

| Bacterial organisms tested: | Minimal bacteriostatic concentrations (in µg./cc.) |
|---|---|
| Staphylococcus aureus—Smith strain | 0.005 |
| Staphylococcus aureus—209 P strain—ATCC 6538 P | 0.01 |
| Staphylococcus aureus—209 P strain rendered resistant to chromomycin | 0.003 |
| Staphylococcus aureus—209 P strain rendered resistant to rufocromomycin | 0.02 |
| Staphylococcus aureus—209 P strain rendered resistant to actinomycin | 0.10 |
| Sarcina lutea—ATCC 9341 | 0.01 |
| Streptococcus faecalis—ATCC 8043 | 0.04 |
| Streptococcus pyogenes hemolyticus (Dig 7 strain, Institut Pasteur) | 0.01 |
| Diplococcus pneumoniae (Til strain, Institut Pasteur) | 0.005 |
| Neisseria catarrhalis (A 152, Institut Pasteur) | 0.04 |
| Lactobacillus casei—ATTC 7469 | 0.003 |
| Bacillus subtilis—ATCC 6633 | 0.03 |
| Bacillus cereus—ATCC 6630 | 0.04 |
| Mycobacterium species—ATCC 607 | 0.50 |
| Escherichia coli—ATCC 9637 | 0.10 |
| Shigella dysenteriae—Shiga L (Institut Pasteur) | 0.10 |
| Salmonella paratyphi A (Lacasse, Institut Pasteur) | 0.60 |
| Salmonella schottmuelleri (paratyphi B) Fougenc (Institut Pasteur) | 0.25 |
| Proteus vulgaris | 0.15 |
| Klebsiella pneumoniae—ATCC 10,031 | 0.40 |
| Klebsiella pneumoniae—strain rendered resistant to daunorubicin | 0.80 |
| Pseudomonas aeruginosa (Bass strain, Institut Pasteur) | 0.15 |
| Brucella bronchiseptica (CN 387, Wellcome Institute) | 0.01 |
| Pasteurella multocida (A 125, Institut Pasteur) | 0.01 |

In addition to its bacteriostatic power, 17,967 R.P. has been found to possess an antitumour activity when tested subcutaneously or intraperitoneally. This activity is particularly exerted against graftable tumours of mice, such as sarcoma 180 (solid form), Ehrlich ascitic tumour and leukaemia L 1210 at doses ranging from 0.2 mg./kg. to 0.005 mg./kg. animal body weight. In the case of sarcoma 180 in mice, the subcutaneous administration of 0.05 mg./kg./day for 5 days caused a reduction in the weight of the tumours of treated mice compared to the weight of those of comparison mice of 80%.

The toxicity of 17,967 R.P. has been determined principally in the case of mice. The 50% lethal doses, or $LD_{50}$, determined subcutaneously (s.c.) and intravenously (i.v.) are given in Table IV.

TABLE IV

| Method of administration: | $LD_{50}$ mg./kg. |
|---|---|
| S.c. | 1.6 |
| I.v. | 0.175 |

The organism which produces 17,967 R.P. belongs to the genus Streptomyces. For reasons given later, it must be considered as a new designated by the name Streptomyces roseopullatus because of the pink colour of its sporulated aerial mycelium and the abundant production of a very deep brown or black soluble pigment which it elaborates on very many synthetic as well as organic culture media.

It was isolated from a sample of soil taken in Brazil. Its isolation was effected using the following standard method: The sample of soil is suspended in sterile distilled water and the suspension diluted to different concentrations; small volumes of each dilution are spread over the surface of Petri dishes containing a suitable nutrient agar medium. After incubation for several days at 26° C., the colonies of microorganisms to be isolated are pricked out and transplanted onto agar slopes in order to obtain more abundant cultures.

Streptomyces roseopullatus, strain DS 20,073 forms short sporiferous filaments which are coiled at their ends to produce several turns, generaly one or two. These sporiferous filaments are inserted onto the filaments of the aerial mycelium which sometimes carry them separately but most frequently in short clusters. The spores are oval and measure about 0.4 to 0.6/0.6 to 0.8µ.

Streptomyces roseopullatus, strain DS 20,073 possesses the property of producing a black melanine pigment on an appropriate tyrosine medium as well as on all organic media; it furthermore forms a very deep brown soluble pigment on a certain number of synthetic agar media. The colour of its sporulated aerial mycelium is pink.

The cultural characteristics and biochemical properties of Streptomyces roseopullatus, strain DS 20,073 are given in Table V which follows. They are those of cultures which have reached a good stage of development, that is to say, in general, after culture of about 3 weeks at 26° C. These characteristics were observed on nutrient agars and broths usually employed to determine the morphological characteristics of strains of streptomyces, the cultures on agar media being effected on agar slopes. A certain number of the culture media employed were prepared in accordance with the formulae indicated in "The Actinomycetes," S.A. Waksman, pp. 193–197, Chronica Botanica Company, Waltham, Mass., U.S.A., 1950; in this case they are indicated by the letter W followed by the number given to them in "The Actinomycetes." The references or compositions of the other culture media are as follows:

Ref. A—"Hickey and Tresner's Agar"—T. G. Pridham et al.—Antibiotics Annual, 1956–1957, p. 950.

Ref. B—K. L. Jones—Journal of Bacteriology, 57, 142, 1949.

Ref. C—"Yeast Extract Agar"—T. G. Pridham et al.— Antibiotics Annual, 1956–1957, p. 950.

Ref. D—"Tomato Paste Oatmeal Agar"—T. G. Pridham et al.—Antibiotics Annual, 1956–1957, p. 950.

Ref. E—"Melanin formation medium"—The Actinomycetes, vol. 2, p. 333, No. 42—S. A. Waksman—The Williams and Wilkins Company, Baltimore, 1961.

Ref. F—W. E. Grundy et al.—Antibiotics and Chem. 2, 401, 1952.

Ref. G—"Inorganic Salts—Starch Agar"—T. G. Pridham et al.—Antibiotics Annual, 1956–1957, p. 951.

Ref. H—"Substrat 1 mit mineralischer Stickstoff quelle," p. 14—G. F. Gause et al., Zur Klassifizierung der Actinomyceten—Veb Gustav Fischer Verlag—Jena— 1958.

Ref. I—Corresponds to Formula W1, with 30 g. of sucrose replaced by 15 g. of glucose.

Ref. J.—Corresponds to Formula W18, with the sucrose replaced by small strips of filter paper partially immersed in the liquid.

Ref. K—"Manual of Methods for Pure Culture Study of Bacteria" of the Society of American Bacteriologists, Geneva, N.Y., II$_{50}$–18.

Ref. L—"Plain gelatine"—Prepared according to the instructions in "Manual of Methods for Pure Culture Study of Bacteria" of the Society of American Bacteriologists, Geneva, N.Y., II$_{50}$–18.

Ref. M—Medium indicated for investigation of the production of $H_2S$ by H. D. Tresner and F. Danga—Journal of Bacteriology, 76, 239–244, 1958.

Ref. N—Skimmed milk as a commercially available powder reconstituted according to the manufacturer's instructions.

TABLE V

| Culture medium | Degree of development | Vegetative mycelium (V.m.) or underside of the culture | Aerial structure (comprising the combination of the aerial mycelium and the sporulation) | Soluble pigment | Observations and biochemical properties |
|---|---|---|---|---|---|
| Hickey and Tresner agar (Ref. A). | Good | Underside very deep yellow-brown. | Greyish pink; very well developed. | Very deep yellow-brown, ranging to blackish. | Oval spores measuring 0.4 to 0.6/0.6 to 0.8 μ. The sporiferous filaments form spirals and are arranged in short clusters. |
| Bennett agar (Ref. B) | do | do | Light greyish pink; average development. | do | |
| Pridham yeast extract agar (Ref. C). | do | do | Greyish pink, well developed. | Very deep yellow-brown, almost black-brown. | |
| Pridham oat and tomato agar (Ref. D). | do | Underside yellow-brown. | Whitish to light greyish pink, well developed. | Deep brown | |
| Glucose-peptone agar (W 6) | do | Underside black-brown. | Greyish, moderately developed. | Black; abundant | |
| Nutrient agar (W 5) | Moderate | V.m. yellow-brown. Moderately developed. | Nil | Yellow-brown | |
| Tyrosine-yeast extract agar for the formation of melanine (Ref. E). | Medium | V.m. black | Nil | Black; abundant; produced from the very start of the culture. | Formation of melanin: strongly positive. |
| Krainsky calcium malate agar (Ref. F). | Moderate | V.m. colourless to yellowish; moderately developed. | Nil | Nil | Solubilisation of calcium malate: positive but slow. |
| Ovalbumin agar (W 12) | do | Underside very deep orange-brown to black-brown. | Slightly pink yellowish grey; poorly developed. | Black; fairly abundant. | |
| Glucose-asparagine agar (W 2) | Good | Underside black-brown. | Greyish pink; moderately developed. | Black-brown | |
| Glycerine-asparagine agar (W 3). | do | Underside orange-brown. | Greyish white to light pink-grey; very moderately developed. | Very deep orange-brown ranging to blackish brown. | |
| Pridham starch-mineral salt agar (Ref. G). | do | Underside yellow-brown. | Light greyish pink; well developed. | Weak brownish grey | Oval spores measuring 0.4 to 0.6/0.6 to 0.8 μ. The sporiferous filaments form spirals and are arranged in short clusters. Hydrolysis of starch: positive. |
| Starch-nitrate agar (W 10) | Very moderate. | Underside yellowish to light brownish. | Whitish to greyish white; very moderately developed. | Brownish | Hydrolysis of starch: positive. |
| Gause synthetic agar (Ref. H) | Good | Underside very deep mahogany brown, ranging to blackish brown. | Pink-white to light greyish pink; well developed. | Black; abundant | |
| Czapek synthetic agar with sucrose (W 1). | do | V.m. deep yellow-brown. | Greyish white to very light yellowish grey; moderately developed. | Very deep brown | |
| Czapek synthetic agar with glucose (Ref. I). | do | V.m. light yellow-brown to deep brown; very well developed. | Nil | Deep orange-brown | |
| Starch-nitrate broth (W 19) | Medium | Fairly well developed velum; underside brownish yellow. | Whitish; very moderately developed. | Yellow-brown | Nitrite reaction: positive. |
| Czapek broth with sucrose (W 18). | Moderate | White flocculent culture, on the surface and sedimenting. | Nil | Nil | Nitrite reaction: weakly positive at the start of the culture, becoming negative fairly rapidly. |
| Czapek broth with cellulose (Ref. J). | No development. | | | | Utilisation of cellulose: negative. |
| Nutrient broth containing nitrate (Ref. K). | Moderate | Greyish-white ring | Nil | Deep brown | Nitrite reaction: negative during tests carried out respectively after 24 hours, 48 hours, 8 days, 15 days, and 1 month's culture. |
| Culture on potato (W 27) | Good | V.m. yellowish grey to blackish brown; very well developed. | Greyish white to pink-grey; very poorly developed. | Black; abundant | |
| 12% Pure gelatine (Ref. L) | do | V.m. developed on the surface, deep yellow-brown. | Nil or greyish white traces. | Deep yellow-brown | Liquefaction: positive but slow. |
| Tresner and Danga agar (Ref. M). | do | V.m. black; well developed. | Nil | Black; abundant. Produced from the very start of the culture. | Production of H₂S: strongly positive. |
| Skimmed milk (Ref. N): (a) 25° C | do | Yellow-brown, well developed ring. | Nil | | Peptonisation complete without coagulation; pH unchanged in 1 month. |
| (b) 37° C | Very good | Deep yellow-brown very well developed ring. | Nil | | Do. |

Amongst the various species respectively described in the following works:

Bergey's Manual of Determinative Bacteriology—7th edition (The Williams and Wilkins Company, Baltimore, 1957),
The Actinomycetes, volume II—S. A. Waksman (The Williams and Wilkins Company, Baltimore, 1961) and
Zur Klassifizierung der Actinomyceten—G. F. Gause et al. (Veb Gustav Fischer Verlag, Jena, 1958).

The one to which *Streptomyces roseopullatus*, strain DS 20,073 shows most similarities is *Streptomyces roseochromogenes* because of its property of elaborating a deep brown soluble pigment on organic media, of presenting a pink-coloured sporulated aerial mycelium and of forming spiral sporophores. It can however not be identified with it, and it is for this reason that it is considered to be a new species, because *Streptomyces roseochromogenes* produces, in particular, a colourless vegetative growth on synthetic agar whilst *Streptomyces roseopullatus,* strain DS 20,073 forms a deep brown vegetative mycelium under these conditions, producing a very deep brown soluble pigment. The same is true of the cultures of these two strains on agar containing glucose and also on agar containing starch although in the latter case the brown colouration of *Streptomyces roseopullatus,* strain DS 20,073 and its production of a soluble brown pigment are less pronounced than in the two former cases.

Furthermore, *Streptomyces roseochromogenes* in certain instances presents a vegetative mycelium with a red pigmentation, which has never been observed with *Streptomyces roseopullatus,* and it renders milk strongly alkaline whilst cultures of *Streptomyces roseopullatus* on milk show a pH which has not significantly changed after a month, both at 25° C. and at 37° C.

The capacity of *Streptomyces roseopullatus,* strain DS 20,073 to utilise various sources of carbon and nitrogen to ensure its development was determined in accordance with the principle of the method of Pridham and Gottlieb (J. of Bact., 56, 107–114, 1948). The degree of development was observed on the base medium indicated by the authors, replacing either the glucose by the various sources of carbon respectively tested, or replacing $(NH_4)_2SO_4$ by the various sources of nitrogen which were respectively tested. The results are given in Table VI.

TABLE VI

| Sources of carbon tested | Utilisation | Sources of nitrogen tested | Utilisation |
|---|---|---|---|
| D-ribose | + | $NaNO_3$ | + |
| D-xylose | + | $NaNO_2$ | + |
| L-arabinose | + | $(NH_4)_2SO_4$ | + |
| L-rhamnose | + | $(NH_4)_2HPO_4$ | + |
| D-glucose | + | Adenine | + |
| D-galactose | + | Adenosine | + |
| D-fructose | + | Uracil | − |
| D-mannose | + | Urea | + |
| L-sorbose | − | L-asparagine | + |
| Lactose | + | Glucosamine | + |
| Maltose | + | Glycine | + |
| Sucrose | + | Sarcosine | − |
| Trehalose | + | DL-alanine | + |
| Cellobiose | + | DL-valine | + |
| Raffinose | + | DL-aspartic acid | + |
| Dextrin | + | L-glutamic acid | + |
| Inulin | − | L-arginine | + |
| Starch | + | L-lysine | + |
| Glycogen | + | DL-serine | + |
| Glycerine | + | DL-threonine | + |
| Erythritol | − | DL-methionine | − |
| Adonitol | − | Taurine | − |
| Dulcitol | − | DL-phenylalanine | + |
| D-mannitol | + | L-tyrosine | + |
| D-sorbitol | − | DL-proline | + |
| Inositol | + | L-hydroxyproline | + |
| | | L-histidine | + |
| | | L-tryptophane | + |
| | | Betaine | + |

According to a feature of the invention, the antibiotic 17,967 R.P. is produced by aerobically cultivating *Streptomyces roseopullatus,* strain DS 20,073 (NRRL 3430), or a 17,967 R.P.-producing mutant thereof, using an aqueous nutrient medium containing assimilable sources of carbon, nitrogen and inorganic substances, and separating the antibiotic 17,967 R.P. formed during the culture.

The culture of *Streptomyces roseopullatus,* strain DS 20,073 can be carried out by any of the know aerobic surface or submerged culture methods, the latter being preferred because they are more convenient. Conventional types of apparatus currently used in the fermentation industry may be employed. In particular, the following sequence of operations may be adopted:

*Streptomyces roseopullatus,* DS 20,073—stock
↓
culture on agar
↓
culture in an agitated flask
↓
inoculum culture in a fermenter
↓
production culture in a fermenter The fermentation medium must contain an assimilable source of carbon and an assimilable source of nitrogen, and inorganic substances and optionally growth-promoting factors; all these ingredients may be supplied as well-defined products or complex mixtures such as those found in natural biological products of various origins.

As the source of assimilable carbon there may be used carbohydrates such as glucose, maltose, dextrins, starch, or other carbon-, hydrogen- and oxygen-containing substances such as certain sugar-alcohols, e.g. glycerin or mannitol, or certain organic acids, e.g. lactic or citric acid. Certain animal or vegetable oils such as lard oil or soya bean oil may be advantageously used instead of, or in admixture with, carbon-, hydrogen- and oxygen-containing substances.

The suitable sources of assimilable nitrogen are extremely varied. They may be very simple chemical compounds such as inorganic and organic ammonium salts, urea or certain amino acids. They may also be complex substances containing principally nitrogen in protein form, e.g. casein, lactalbumin, gluten and their hydrolysates, soya bean meal, peanut meal, fish meal, meat extract, yeast extract, distillers' solubles or corn-steep liquor.

Amongst the inorganic substances added, some may have a buffering or neutralising effect, such as the alkali metal or alkaline earth metal phosphates, or the carbonates of calcium or magnesium. Others contribute to the ionic equilibrium needed for the development of *Streptomyces roseopullatus,* strain DS 20,073 and for the production of the antibiotic; examples of these are the chlorides and sulphates of the alkali metals and alkaline earth metals. Finally, some of them act more especially as activators of the metabolism of *Streptomyces roseopullatus:* to these belong the salts of zinc, cobalt, iron, copper and manganese.

The pH of the fermentation medium at the start of the culture should be between 6.0 and 7.8, and preferably between 6.5 and 7.5. The optimum fermentation temperature is 25–30° C., but satisfactory production is achieved at temperatures of from 23° to 33° C. The rate of aeration of the fermentation broth can vary within quite wide limits, but it has been found that an aeration rate of 0.3 to 3 litres of air per litre of broth per minute is particularly suitable. The maximum yield of antibiotic is obtained after 2 to 8 days culture, but this period depends predominantly on the medium used.

From the foregoing it will be realised that the general conditions for the culture of *Streptomyces roseopullatus,* strain DS 20,073 for the production of the antibiotic 17,967 R.P. may be widely varied and adapted as appropriate to the circumstances.

17,967 R.P. may be isolated from the fermentation broths in the following manner:

The antibiotic is directly extracted from the fermentation broth with solvents which are immiscible with water such as aliphatic alcohols having at least 4 carbon atoms, esters such as ethyl acetate, and chlorinated hydrocarbons such as dichloroethane, methylene chloride or chloroform. It is advantageous to carry out this operation with the broths at pH 7. After filtration of the broths and decantation of the antibiotic solution, the crude product may be isolated from the abovementioned organic solutions by concentrating the solution under reduced pressure followed by precipitation of the antibiotic with a non-solvent or a poor solvent for it such as hexane.

Crude 17,967 R.P. may be purified by the methods which are conventionally used, such as recrystallisation or chromatography on various adsorbents:

(a) Recrystallisation: 17,967 R.P. is dissolved in a good solvent such as dimethylformamide and the resulting solution is progressively diluted with a suitable poor solvent, for example a 50–50 (v./v.) mixture of methanol-water, or a 50–50 (v./v.) mixture of acetone-water.

(b) Chromatography of a solution of 17,967 R.P. on various adsorbents: silica gels are preferably used. 17,967

R.P. is fixed on the adsorbent either by passing a solution of the antibiotic in a good solvent such as dimethylformamide through a column of adsorbent, or by intimately mixing the adsorbent and a solution of the antibiotic in a suitable solvent mixture so as to obtain a broth of which the liquid phase is thereafter evaporated. 17,967 R.P. is then eluted from the adsorbent with solvents based on acetone. In addition to acetone itself, mixtures of solvents such as a 50–50 (v./v.) mixture of dimethylformamide-acetone or a 78–20–2 (v./v.) mixture of the chloroform-methanol-acetone may be used. The enriched 17,967 R.P. is recovered by concentration of the eluate or, as before, by adding a poor solvent to the eluate.

It will be understood that the various methods indicated above for the extraction, isolation and purification of 17,967 R.P. may be repeated several times as required for the production of this antibiotic in a form appropriate for the envisaged application.

The following non-limitative examples illustrate the invention. In the following the activity is always determined by biological determination using the turbidimetric method with *Staphylococcus aureus* 609 P as the sensitive microorganism. The unit of activity is a microgram of pure crystalline product. This activity is expressed in units per milligram ($\mu$/mg.) for solid products and in units per cubic centrimetre ($\mu$/cc.) for solutions.

EXAMPLE 1

A 350 litre fermenter is charged with corn-steep (50% solids content)—5 kg.
partially hydrolysed starch—7.5 kg.
tapwater: sufficient to make up to 220 litres.

The pH is adjusted to 6.85 with 10 N sodium hydroxide solution (450 cc.). The medium is sterilised by bubbling steam at 122° C. through it for 40 minutes. After cooling, the volume of the broth is 250 litres and the pH is 6.85. It is then inoculated with a culture (200 cc.) of *Streptomyces roseopullatus,* strain DS 20,073 (NRRL 3430) in a stirred Erlenmeyer flask. The culture is developed at 27° C. for 27 hours with agitation and aeration with sterile air; it is then suitable for inoculation of the production culture.

The production culture is carried out in an 800-litre fermenter charged with the following substances:

distillers' solubles—7.5 kg.
corn-steep (50% solids content)—10 kg.
soya bean oil—10 litres
cobalt chloride hexahydrate—10 g.
tapwater, sufficient to make up to 450 litres.

The pH is adjusted to 7.25 with 10 N sodium hydroxide solution (1800 cc.) and calcium carbonate (2.5 kg.) is then added. The medium is sterilised by bubbling steam at 122° C. through it for 40 minutes. After cooling, the volume of the broth is 490 litres. It is made up to 500 litres by adding a sterile aqueous solution (5 litres) containing cerelose (2.5 kg.) and a sterile aqueous solution (5 litres) containing ammonium sulphate (1 kg.). The pH of the medium is then 7.10.

Inoculation is then effected with the inoculum culture (40 litres) in a 350-litre fermenter described above. The production culture is carried out at 27° C. for 138 hours with agitation using a motor rotating at 175 revolutions per minute, and aeration with a stream of sterile air of 20 m³./hour. The pH of the medium is then 7.40 and the volume of the broth is 450 litres. The amount of antibiotic present is 27 $\mu$/cc.

EXAMPLE 2

The fermentation broth (450 litres), obtained under the conditions of Example 1 and of strength 27 $\mu$/cc., is introduced into a vat provided with a stirrer. The pH of the broth is adjusted to 7 with 5 N hydrochloric acid (200 cc.). Ethyl acetate (400 litres) is then added and the mixture stirred for one hour. After this time a filtration aid (50 kg.) is added and the suspension is filtered on a filter press. The filter cake is washed with ethyl acetate (100 litres) and then with water (100 litres). The combination of the filtrate and of the wash liquors, amounting to 1000 litres, is decanted. The organic upper phase is collected; its volume is 390 litres. The lower aqueous phase, of which the volume is 610 litres, is discarded. The organic extract is washed with water (40 litres) in a stirred vat, and, after withdrawal of the aqueous layer, the washed extract is collected.

The washed organic extract is concentrated under reduced pressure (70 mm. Hg) at 27° C. to a volume of 3 litres. The concentrate is diluted with hexane (30 litres) and the antibiotic precipitates. It is isolated by filtration, washed with hexane and dried at 40° C. in an oven under reduced pressure (5 mm. Hg). Crude 17,967 R.P. (31 g.) of strength 244 $\mu$/mg. is obtained.

EXAMPLE 3

Crude 17,967 R.P. (47 g.), obtained as described in Example 2, is dissolved in dimethylformamide (1 litre) with stirring. The resulting solution is clarified by filtration. A mixture of methanol-water (50–50 by volume; 1.5 litres) is added slowly over the course of four hours, with stirring, in order to cause 17,967 R.P. to crystallise. The crystals are filtered off and washed with a mixture of methanol-water (50–50 by volume; 0.3 litre) and with acetone (0.2 litre). The crystals are dried for 15 hours at 50° C. under reduced pressure (5 mm. Hg) to yield a crystalline product (8.7 g.) of strength 600 $\mu$/mg.

EXAMPLE 4

The product (8.4 g.), obtained as described in Example 3, is dissolved in dimethylformamide (250 cc.) with stirring. The resulting solution is chromatographed through a column containing Merck silica gel (120 g.) impregnated with a mixture of dimethylformamide-acetone (50–50 by volume). The silica gel is washed with the dimethylformamide-acetone mixture (50–50 by volume; 500 cc.). A mixture of methanol-water (50–50 by volume; 500 cc.) is added to the yellow-coloured fraction (about 500 cc., containing 17,967 R.P.) and this causes 17,967 R.P. to crystallise. The crystals are filtered off and washed with a mixture of methanol-water (50–50 by volume; 150 cc.) and acetone (100 cc.). The product is dried for 15 hours at 50° C. under reduced pressure (5 mm. Hg) to yield 17,967 R.P. (5.74 g.) of strength 880 $\mu$/mg.

EXAMPLE 5

17,967 R.P. (21.7 g.), obtained as described in Example 4, is dissolved in dimethylformamide (600 cc.) with stirring. The solution is clarified by filtration. A mixture of acetone-water (50–50 by volume; 1200 cc.) is added slowly over the course of 4 hours, with slow stirring, in order to cause 17,967 R.P. to recrystallise. The resulting crystals are filtered off, washed with a mixture of acetone-water (50–50 by volume; 200 cc.) and with acetone (200 cc.), and dried for 15 hours at 50° C. under reduced pressure (5 mm. Hg) and then for 8 hours at 50° C. under 0.5 mm. Hg. Pure 17,967 R.P. (18.2 g.) of strength 1000 $\mu$/mg. is obtained.

EXAMPLE 6

The product (20 g.) obtained as described in Example 2, of strength 195 $\mu$/mg., is dissolved in a mixture of acetone-dioxan-water (10–3–1 by volume). The resulting solution is filtered to remove insoluble material (6.5 g.). Merck silica gel (200 g.) is added to the solution and the mixture concentrated to dryness in a rotating evaporator to yield 17,967 R.P. fixed to the silica gel. A column of Merck silica gel (1 kg.) in chloroform is prepared (h=51 cm., d=7 cm.) and the 17,967 R.P. fixed to the silica gel is placed at the top of this column. Elution is effected successively with the following solvents:

Litres
(1) Chloroform-methanol-acetone (78–20–2 by volume) _____ 4
(2) Acetone _____ 4

The eluates are concentrated to a volume of 100 cc. 17,967 R.P. precipitates during the concentration and dimethylformamide (50 cc.) is added to the concentrate in order to redissolve the precipitate and the mixture is again concentrated to 50 cc. Water (30 cc.) is added slowly over the course of 1 hour in order to cause 17,967 R.P. to crystallise. The crystals are filtered off, washed with dioxan (20 cc.) and dried for 15 hours at 50° C. under reduced pressure (5 mm. Hg) to give purified 17,967 R.P. (1.17 g.) of strength 925 μ/mg.

We claim:

1. The antibiotic herein designated 17,967 R.P. which has the following characteristics: it is a yellow microcrystalline powder melting at 290–300° C. with decomposition, which is soluble in dimethylformamide, relatively soluble in pyridine, very slightly soluble in water, acetone and methanol, and insoluble in diethyl ether, cyclohexane and hexane; it has the elementary composition C=61.5%, H=5.25%, O=20.0%, N=12.5%; its ultra-violet spectrum (determined with a solution of 10.5 mg./l. in dimethylformamide) shows absorption maxima at 268 nm. ($E_{1cm.}^{1\%}=377$) and 368 nm. ($E_{1cm.}^{1\%}=707$)

and an absorption minimum at 285 nm. ($E_{1cm.}^{1\%}=281$)

and its infra-red spectrum (determined with tablets of a mixture with potassium bromide) shows principal absorption bands as follows: 3460 strong, 3350 shoulder, 3230 shoulder, 2930 strong, 2850 medium, 2690 shoulder, 2590 strong, 2350 shoulder, 2160 very weak, 1720 shoulder, 1655 shoulder, 1630 very strong, 1610 shoulder, 1600 shoulder, 1575 strong, 1515 strong, 1490 shoulder, 1475 shoulder, 1455 very strong, 1440 medium, 1420 strong, 1390 medium, 1375 strong, 1350 strong, 1325 medium, 1315 weak, 1305 strong, 1280 shoulder, 1265 very strong, 1240 medium, 1220 shoulder, 1185 medium, 1175 shoulder, 1170 medium, 1150 strong, 1125 shoulder, 1115 strong, 1100 shoulder, 1075 medium, 1045 medium, 1035 shoulder, 1020 medium, 1010 weak, 1000 weak, 980 very weak, 955 medium, 910 shoulder, 880 shoulder, 855 medium, 805 medium, 775 weak, 760 weak, 735 medium, 675 medium, 660 shoulder, 625 shoulder, 585 medium, 530 medium, 480 shoulder, 465 medium, 430 shoulder, 400 medium, 365 weak and 325 medium, and its optical rotation is $[\alpha]_D^{20}=+103°\pm2°$ (c.=0.5 dimethylformamide).

2. Process for the production of the antibiotic 17,967 R.P. as defined in claim 1 which comprises aerobically cultivating Streptomyces roseopullatus DS 20,073 (NRRL 3430), using an aqueous nutrient medium containing assimilable sources of carbon, nitrogen and inorganic substances until a substantial amount of antibiotic 17,967 R.P. is formed, and separating the 17,967 R.P. formed during the culture.

3. Process according to claim 2 in which the culture is effected under submerged aerobic culture conditions commencing at a pH within the range 6.0 and 7.8 and at a temperature of from 23° to 33° C.

4. Process according to claim 3 in which the pH of the nutrient medium at the beginning of the culture is between 6.5 and 7.5.

5. Process according to claim 3 in which the temperature of the culture medium is 25°–30° C.

6. Process according to claim 3 in which the culture medium is aerated at a rate of from 0.3 to 3 litres of air per litre of medium per minute.

7. Process according to claim 2 in which 17,967 R.P. is separated from the culture medium by extracting the antibiotic with a solvent which is immiscible with water selected from the group consisting of aliphatic alcohols having at least 4 carbon atoms, esters and chlorinated hydrocarbons.

8. Process according to claim 7 in which ethyl acetate, dichloroethane, methylene chloride or chloroform is employed to extract the antibiotic from the culture medium.

9. Process according to claim 8 in which extraction of the antibiotic from the culture medium is effected with the medium at pH 7.

10. Process according to claim 7 in which 17,967 R.P. is separated from its organic solution by concentrating the solution under reduced pressure and precipitating the antibiotic from the concentrate by addition of hexane.

References Cited
UNITED STATES PATENTS

| | | | |
|---|---|---|---|
| 3,335,059 | 8/1967 | De Long et al. | 424—121 |
| 3,344,025 | 9/1967 | Whaley et al. | 424—121 |

ALBERT T. MEYERS, Primary Examiner

D. M. STEPHENS, Assistant Examiner